United States Patent
Miyoshi et al.

(10) Patent No.: US 11,901,929 B2
(45) Date of Patent: *Feb. 13, 2024

(54) COMMUNICATION SYSTEM AND COMMUNICATION METHOD

(71) Applicant: Panasonic Holdings Corporation, Osaka (JP)

(72) Inventors: Kenichi Miyoshi, Kanagawa (JP); Hidetoshi Suzuki, Kanagawa (JP); Katsuhiko Hiramatsu, Osaka (JP); Christian Wengerter, Kleinheubach (DE); Alexander Golitschek Edler Von Elbwart, Hessen (DE)

(73) Assignee: Panasonic Holdings Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,866

(22) Filed: Sep. 6, 2022

(65) Prior Publication Data
US 2023/0006707 A1    Jan. 5, 2023

Related U.S. Application Data

(63) Continuation of application No. 16/858,075, filed on Apr. 24, 2020, now Pat. No. 11,469,786, which is a
(Continued)

(30) Foreign Application Priority Data

Aug. 5, 2005  (JP) ................. 2005-228687

(51) Int. Cl.
*H04B 1/40*    (2015.01)
*H04L 1/00*    (2006.01)
(Continued)

(52) U.S. Cl.
CPC ............... *H04B 1/40* (2013.01); *H04B 15/00* (2013.01); *H04L 1/0042* (2013.01);
(Continued)

(58) Field of Classification Search
CPC ......... H04B 1/40; H04B 15/00; H04L 1/0042; H04L 5/0046; H04L 25/0202;
(Continued)

(56) References Cited

U.S. PATENT DOCUMENTS 5,406,570 A    4/1995  Berrou et al.
5,590,155 A *  12/1996 Yasuda ............... H04L 27/2092
                                              375/281
(Continued)

FOREIGN PATENT DOCUMENTS

CN    1406420 A    3/2003
DE    101 56 822 A1    5/2003
(Continued)

OTHER PUBLICATIONS

3GPP TSG-RAN WG1, "DTX Proposal for multi-level modulation in HSDPA," Mitsubishi Electric, R1-010454, May 21-25, 2001, pp. 1-10.
(Continued)

*Primary Examiner* — Kabir A Timory
(74) *Attorney, Agent, or Firm* — Seed IP Law Group LLP

(57) ABSTRACT

Provided is a wireless communication apparatus wherein channel estimation accuracy is improved while keeping the position of each bit in a frame, even when a modulation system having a large modulation multiple value is used for a data symbol. In the wireless communication apparatus, an encoding section encodes and outputs transmitting data to a bit converting section, and the bit converting section converts at least one bit of a plurality of bits constituting a data symbol to be used for channel estimation, among the
(Continued)

encoded bit strings, into '1' or '0' and outputs it to a modulating section. The modulating section modulates the bit string inputted from the bit converting section by using a single modulation mapper and a plurality of data symbols are generated.

20 Claims, 17 Drawing Sheets

Related U.S. Application Data continuation of application No. 16/670,391, filed on Oct. 31, 2019, now Pat. No. 10,673,483, which is a continuation of application No. 16/376,047, filed on Apr. 5, 2019, now Pat. No. 10,511,343, which is a continuation of application No. 16/155,234, filed on Oct. 9, 2018, now Pat. No. 10,298,286, which is a continuation of application No. 15/901,290, filed on Feb. 21, 2018, now Pat. No. 10,148,309, which is a continuation of application No. 15/652,731, filed on Jul. 18, 2017, now Pat. No. 9,935,673, which is a continuation of application No. 15/363,595, filed on Nov. 29, 2016, now Pat. No. 9,755,689, which is a continuation of application No. 15/139,880, filed on Apr. 27, 2016, now Pat. No. 9,544,008, which is a continuation of application No. 14/834,909, filed on Aug. 25, 2015, now Pat. No. 9,363,053, which is a continuation of application No. 14/603,845, filed on Jan. 23, 2015, now Pat. No. 9,148,267, which is a continuation of application No. 14/326,133, filed on Jul. 8, 2014, now Pat. No. 8,982,990, which is a continuation of application No. 14/071,301, filed on Nov. 4, 2013, now Pat. No. 8,817,911, which is a continuation of application No. 13/753,271, filed on Jan. 29, 2013, now Pat. No. 8,605,824, which is a continuation of application No. 11/997,892, filed as application No. PCT/JP2006/315521 on Aug. 4, 2006, now Pat. No. 8,391,411.

(51) Int. Cl.
| | |
|---|---|
| *H04L 25/02* | (2006.01) |
| *H04L 27/18* | (2006.01) |
| *H04L 27/38* | (2006.01) |
| *H04B 15/00* | (2006.01) |
| *H04L 27/04* | (2006.01) |
| *H04L 5/00* | (2006.01) |
| *H04L 27/36* | (2006.01) |
| *H04L 27/34* | (2006.01) |

(52) U.S. Cl.
CPC ........ *H04L 5/0046* (2013.01); *H04L 25/0202* (2013.01); *H04L 25/0212* (2013.01); *H04L 25/0224* (2013.01); *H04L 27/04* (2013.01); *H04L 27/18* (2013.01); *H04L 27/183* (2013.01); *H04L 27/34* (2013.01); *H04L 27/36* (2013.01); *H04L 27/38* (2013.01)

(58) Field of Classification Search
CPC . H04L 25/0212; H04L 25/0224; H04L 27/04; H04L 27/18; H04L 27/183; H04L 27/34; H04L 27/36; H04L 27/38
See application file for complete search history.

(56) References Cited

U.S. PATENT DOCUMENTS

| | | | |
|---|---|---|---|
| 5,809,083 | A | 9/1998 | Wright |
| 6,233,712 | B1 | 5/2001 | Rhee et al. |
| 6,442,218 | B1 | 8/2002 | Nakamura et al. |
| 6,587,510 | B1 * | 7/2003 | Minami ............... H04W 52/56 375/285 |
| 6,907,084 | B2 | 6/2005 | Jeong |
| 7,130,587 | B2 | 10/2006 | Hikokubo et al. |
| 7,131,049 | B2 | 10/2006 | Kim et al. |
| 7,224,743 | B2 | 5/2007 | Holmes et al. |
| 7,340,008 | B2 | 3/2008 | Kim et al. |
| 7,379,504 | B2 | 5/2008 | Karaoguz et al. |
| 7,643,585 | B2 | 1/2010 | Sawada |
| 7,860,186 | B2 | 12/2010 | Yano et al. |
| 2001/0017896 | A1 | 8/2001 | Murakami et al. |
| 2001/0038617 | A1 | 11/2001 | Schmidt et al. |
| 2002/0154704 | A1 | 10/2002 | Reshef |
| 2002/0186800 | A1 | 12/2002 | Berthet et al. |
| 2003/0014709 | A1 | 1/2003 | Miyoshi et al. |
| 2003/0076870 | A1 | 4/2003 | Moon et al. |
| 2003/0081576 | A1 | 5/2003 | Kim et al. |
| 2003/0081690 | A1 | 5/2003 | Kim et al. |
| 2003/0108122 | A1 | 6/2003 | Hiraki |
| 2003/0112888 | A1 | 6/2003 | Takano et al. |
| 2003/0172338 | A1 | 9/2003 | Miyata et al. |
| 2004/0001564 | A1 | 1/2004 | Chan et al. |
| 2004/0022179 | A1 | 2/2004 | Giannakis et al. |
| 2004/0100897 | A1 | 5/2004 | Shattil |
| 2004/0128605 | A1 | 7/2004 | Sibecas et al. |
| 2004/0141548 | A1 | 7/2004 | Shattil |
| 2004/0218684 | A1 | 11/2004 | Golitschek Edler Von Elbwart et al. |
| 2004/0260985 | A1 | 12/2004 | Krieger |
| 2005/0008081 | A1 | 1/2005 | Yamazaki et al. |
| 2005/0047522 | A1 | 3/2005 | Kim et al. |
| 2005/0152474 | A1 | 7/2005 | Murakami et al. |
| 2005/0180531 | A1 | 8/2005 | Wellig et al. |
| 2005/0254605 | A1 | 11/2005 | Holmes et al. |
| 2011/0141994 | A1 | 6/2011 | Wengerter et al. |

FOREIGN PATENT DOCUMENTS

| | | |
|---|---|---|
| EP | 1 083 660 A1 | 3/2001 |
| EP | 1 128 586 A2 | 8/2001 |
| EP | 1 313 248 A1 | 5/2003 |
| EP | 1 427 128 A1 | 6/2004 |
| JP | 01-122242 A | 5/1989 |
| JP | H11-243434 A | 9/1999 |
| JP | 2000-82978 A | 3/2000 |
| JP | 2000-083071 A | 3/2000 |
| JP | 2003-37644 A | 2/2003 |
| JP | 2003-134092 A | 5/2003 |
| JP | 2004-297144 A | 10/2004 |
| WO | 99/12283 A1 | 3/1999 |
| WO | 2004/036818 A1 | 4/2004 |

OTHER PUBLICATIONS

Extended European Search Report dated Oct. 16, 2018, for EP Patent Application No. 18182021.8.
English Translation of Search Report which is an annex to Chinese Office Action dated May 28, 2014.
European Office Action dated Feb. 21, 2014.
International Search Report dated Sep. 26, 2006.
J. Proakis, et al., "Communication Systems Engineering," Prentice Hall, ISBN 0-13-095007-6, 2002, pp. 353-354.
Notice of Reasons for Rejection dated Nov. 6, 2012.
Supplementary European Search Report dated Jul. 4, 2013.

* cited by examiner

| CONVERSION SYMBOL | NUMBER OF CONVERSION BITS |
|---|---|
| 3 | 1 |
| 5 | 3 |
| 7 | 2 |

FIG.8

| CONVERSION SYMBOL | MODULATION SCHEME |
|---|---|
| 3 | 8PSK |
| 5 | BPSK |
| 7 | QPSK |

FIG.9

COMMUNICATION SYSTEM AND COMMUNICATION METHOD

BACKGROUND

Technical Field

The present disclosure relates to a radio communication apparatus and a radio communication method.

Description of the Related Art

In order to improve the accuracy of channel estimation in mobile communication, a conventional technique is proposed for carrying out tentative decision of data symbols, calculating a channel estimation value, weighting the channel estimation value according to the reliability of tentative decision data and combining two channel estimation values of the weighted channel estimation value and a channel estimation value calculated from the pilot symbol (refer to Patent Document 1).

Upon channel estimation, this conventional technique uses a channel estimation value alone calculated from tentative decision data with the high reliability, and so improvement of the accuracy of channel estimation is anticipated.
Patent Document 1: Japanese Patent Application Laid-Open No. 2000-82978.

BRIEF SUMMARY

Problems to be Solved by the Disclosure

However, when a modulation scheme with a large M-ary modulation number such as 16QAM is used for data symbols, the reliability of tentative decision data decreases, and so, in the above conventional technique with a large M-ary modulation number such as 16QAM, improvement of the accuracy of channel estimation is not anticipated.

In contrast with this, in order to suppress a transmission rate decrease and improve the accuracy of channel estimation, a method may be adopted of decreasing the M-ary modulation number for part of data symbols than the M-ary modulation numbers for other data symbols, realizing easy tentative decision of part of the data symbols and thereby improving the reliability of tentative decision data.

However, this method can be adopted for modulation schemes with large M-ary modulation numbers, but the number of bits forming part of data symbols decreases due to the change in the M-ary modulation number and therefore the position of each bit in the frame is sequentially shifted forward from the data symbols for which the M-ary modulation number is changed. Then, when the position of each bit is shifted, it is necessary on the receiving side of the data symbols to carry out reception processing supporting the shift and therefore reception processing becomes complicated.

It is therefore an object of the present disclosure to provide a radio communication apparatus and radio communication method that, even when a modulation scheme with a large M-ary modulation number is used for a data symbol, can keep the position of each bit in the frame and improve the accuracy of channel estimation.

Means for Solving the Problem

The radio communication apparatus according to the present disclosure adopts a configuration including: a converting section that carries out bit conversion of at least one of a plurality of bits forming a first data symbol in a bit sequence, to 1 or 0; a modulating section that modulates the bit sequence after the bit conversion using a single modulation mapper to generate a plurality of data symbols including the first data symbol; and a transmitting section that transmits the plurality of data symbols.

Advantageous Effect of the Disclosure

According to the present disclosure, even when a modulation scheme with a large M-ary modulation number is used for a data symbol, it is possible to keep the position of each bit in the frame and improve the accuracy of channel estimation.

BRIEF DESCRIPTION OF THE SEVERAL VIEWS OF THE DRAWINGS

FIG. 8 is an example of control information according to Embodiment 1 of the present disclosure (Example 1);

FIG. 9 is an example of control information according to Embodiment 1 of the present disclosure (Example 2);

DETAILED DESCRIPTION

Hereinafter, embodiments of the present disclosure will be described with reference to the attached drawings.

Embodiment 1

Figure 1:
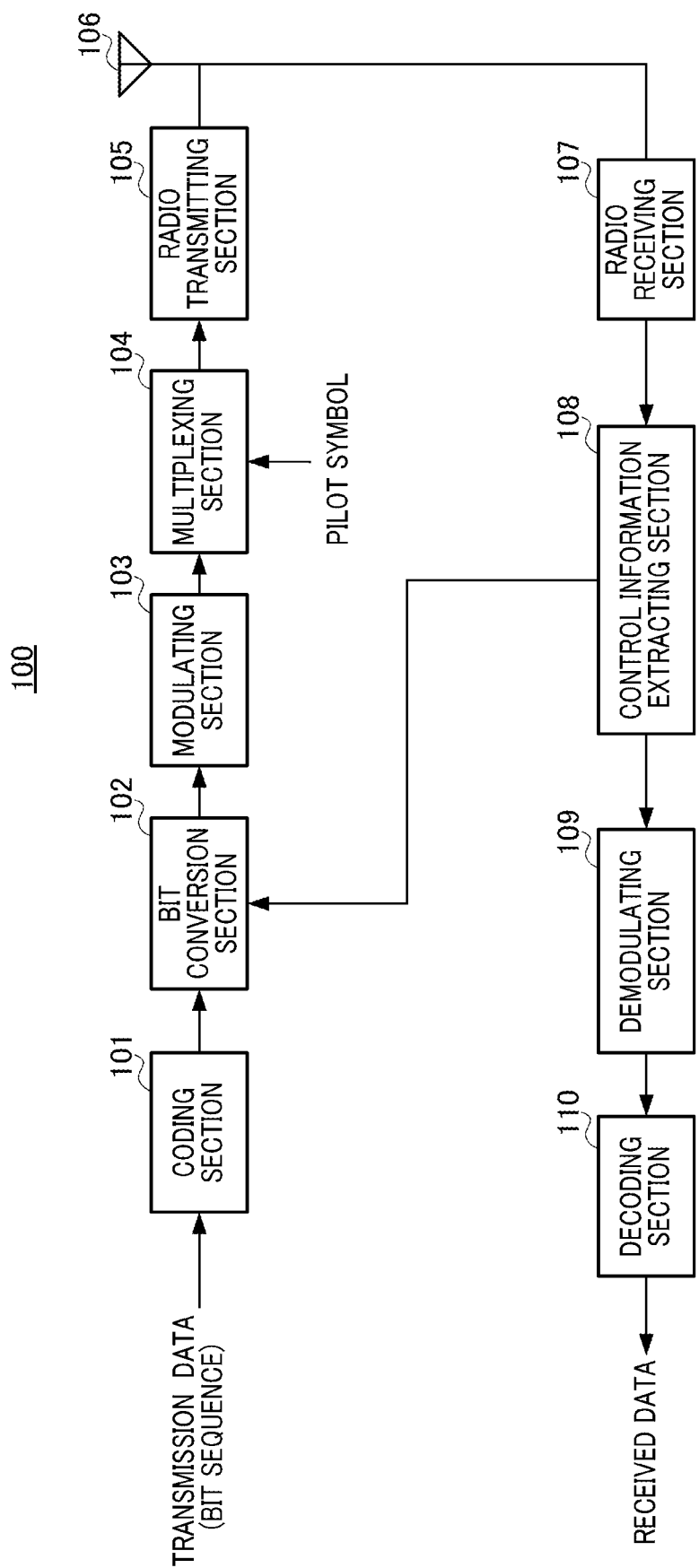
FIG. 1 is a block diagram showing a configuration of the radio communication apparatus on the transmitting side according to Embodiment 1 of the present disclosure.
Figure 2:
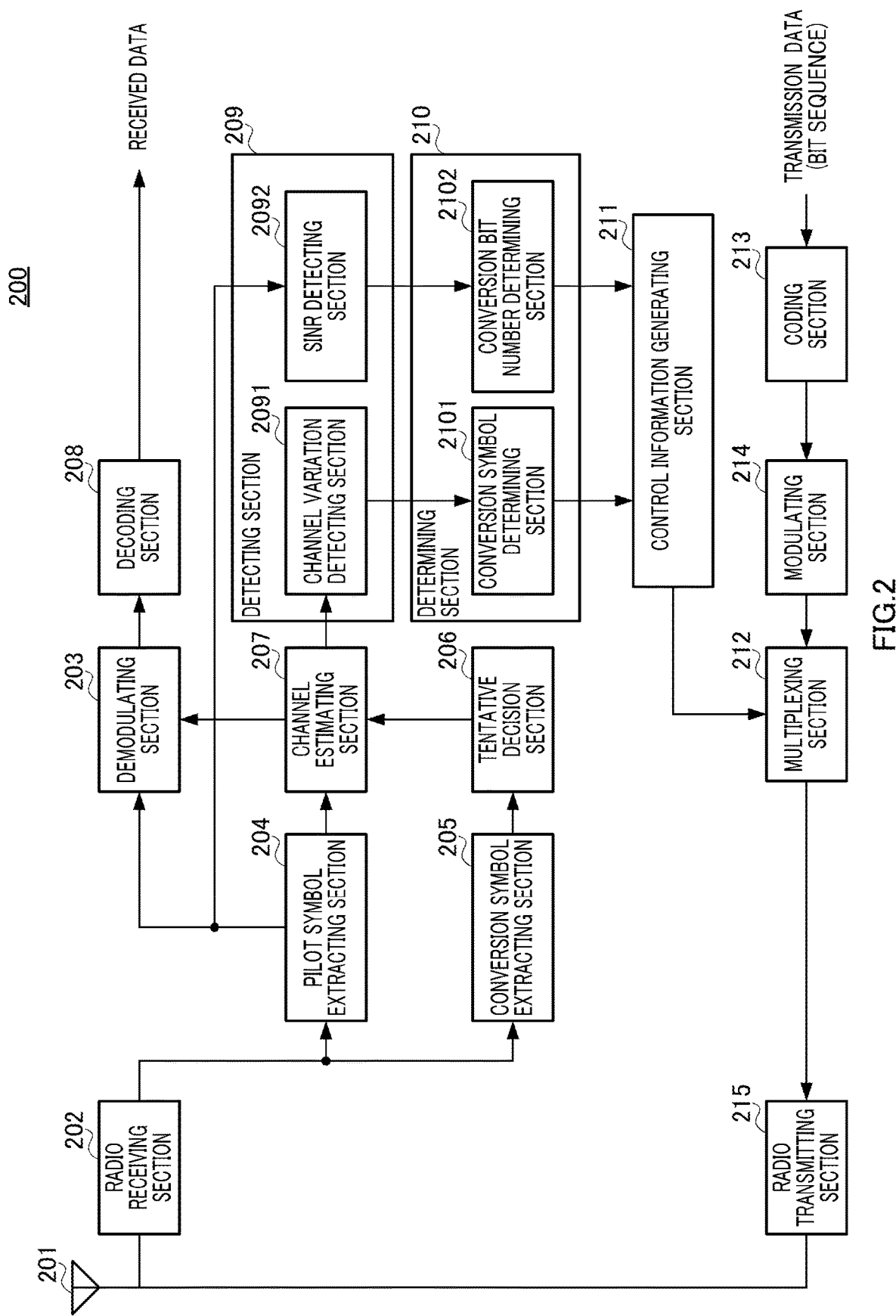
FIG. 2 is a block diagram showing a configuration of the radio communication apparatus on the receiving side according to Embodiment 1 of the present disclosure.

FIG. 1 shows a configuration of radio communication apparatus 100 on the transmitting side according to this embodiment. Further, FIG. 2 shows a configuration of radio communication apparatus 200 on the receiving side according to this embodiment. This radio communication apparatus 200 receives data symbols transmitted from radio communication apparatus 100 and carries out channel estimation.

In radio communication apparatus 100 shown in FIG. 1, coding section 101 encodes transmission data (i.e., bit sequence) and outputs the result to bit conversion section 102.

Out of the encoded bit sequence, bit conversion section 102 converts at least one of a plurality of bits forming the data symbols used in channel estimation in radio communication apparatus 200, to "1" or "0," and outputs the bit to modulating section 103. Further, bit conversion section 102 carries out bit conversion according to control information inputted from control information extracting section 108. Bit conversion will be described in detail later.

Modulating section 103 modulates the bit sequence inputted from bit conversion section 102 using a single modulation mapper, to generate a plurality of data symbols and outputs the data symbols to multiplexing section 104.

Multiplexing section 104 multiplexes pilot symbols over the data symbols and outputs the result to radio transmitting section 105. Here, the pilot symbols are time-multiplexed on a per frame basis.

Radio transmitting section 105 carries out transmitting processing such as D/A conversion, amplification and up-conversion of the pilot symbols and data symbols and transmits the result to radio communication apparatus 200 shown in FIG. 2 from antenna 106.

Radio receiving section 107 receives a signal which is transmitted from radio communication apparatus 200 and which includes control information and data symbols, through antenna 106 and carries out reception processing such as down-conversion and D/A conversion of this received signal. The received signal after the reception processing is inputted to control information extracting section 108.

Control information extracting section 108 extracts the control information from the received signal and outputs the control information to bit conversion section 102. Further, control information extracting section 108 outputs the received signal after the control information is extracted, that is, the data symbol, to demodulating section 109.

Demodulating section 109 demodulates the data symbol into a bit sequence and outputs the bit sequence to decoding section 110.

Decoding section 110 decodes the bit sequence to obtain received data.

On the other hand, in radio communication apparatus 200 shown in FIG. 2, radio receiving section 202 receives a signal which is transmitted from radio communication apparatus 100 and which includes the pilot symbols and data symbols, through antenna 201, and carries out reception processing such as down-conversion and D/A conversion of the received signal. The received signal after the reception processing is inputted to pilot symbol extracting section 204 and conversion symbol extracting section 205.

Pilot symbol extracting section 204 extracts the pilot symbol from the received signal and outputs the pilot symbol to channel estimating section 207. Further, pilot symbol extracting section 204 outputs the received signal after the pilot symbol is extracted, that is, the data symbol, to demodulating section 203 and SINR detecting section 2092.

Conversion symbol extracting section 205 extracts the data symbol subjected to bit conversion in radio communication apparatus 100, from the received signal, and outputs the result to tentative decision section 206.

Tentative decision section 206 carries out tentative decision of the data symbol subjected to bit conversion in radio communication apparatus 100 and outputs the data symbol after the tentative decision to channel estimating section 207.

Channel estimating section 207 calculates a channel estimation value using the pilot symbol. This channel estimation value is calculated according to general channel estimation. Further, channel estimating section 207 calculates a channel estimation value using the data symbol after the tentative decision by carrying out the same channel estimation as the pilot symbol. Both the channel estimation value calculated from the pilot symbol and the channel estimation value calculated from the data symbol after the tentative decision are inputted to demodulating section 203 and channel variation detecting section 2091.

Demodulating section 203 corrects channel variation of the data symbol using both the channel estimation value calculated from the pilot symbol and the channel estimation value calculated from the data symbol after the tentative decision, demodulates a data symbol after the channel variation is corrected to a bit sequence, and outputs the bit sequence to decoding section 208.

Decoding section 208 decodes the bit sequence to obtain received data.

Channel variation detecting section 2091 detects the amount of channel variation in the frame using both the channel estimation value calculated from the pilot symbol and the channel estimation value calculated from the data symbol after the tentative decision, and outputs the result to conversion symbol determining section 2101. Further, when the amount of channel variation is separately detected in the time domain and the frequency domain, the amount of channel variation in the time domain may be detected using the maximum Doppler frequency (fd) and the amount of channel variation in the frequency domain may be detected using a delay profile.

SINR detecting section 2092 detects the SINR of each inputted data symbol and outputs the detection result to conversion bit number determining section 2102.

Channel variation detecting section 2091 and SINR detecting section 2092 form detecting section 209.

Conversion symbol determining section 2101 determines a data symbol subject to bit conversion at radio communication apparatus 100, based on the amount of channel variation in the frame. When the amount of channel variation is greater, conversion symbol determining section 2101 increases the number of data symbols subject to bit conversion in the frame to further improve the accuracy of channel estimation. By increasing the number of data symbols subject to bit conversion, the number of data symbols with improved accuracy of tentative decision increases, so that it is possible to improve the accuracy of channel estimation. Further, conversion symbol determining section 2101 may equally arrange data symbols subject to bit conversion in each frame and arrangement may be carried out such that the number of data symbols subject to bit conversion increases gradually with distance from the pilot symbol. The determination result at conversion symbol determining section 2101 is inputted to control information generating section 211.

Conversion bit number determining section 2102 determines the number of bits subject to conversion on a per data symbol basis, based on the SINR of each data symbol. Conversion bit number determining section 2102 increases the number of bits subject to conversion for data symbols with poorer SINR. When the number of bits subject to conversion is increased, the accuracy of tentative decision improves as described later, so that it is possible to improve the accuracy of channel estimation. The determination result at conversion bit number determining section 2102 is inputted to control information generating section 211.

Further, conversion symbol determining section 2101 and conversion bit number determining section 2102 form determining section 210.

Control information generating section 211 generates the determination result at determining section 210, that is, control information showing the data symbol subject to bit conversion and the number of bits subject to conversion, and outputs the control information to multiplexing section 212.

Coding section 213 encodes transmission data (i.e., bit sequence) and outputs the encoded data to modulating section 214.

Modulating section 214 modulates the encoded bit sequence, to generate a plurality of data symbols and outputs the data symbols to multiplexing section 212.

Multiplexing section 212 multiplexes the control information over the data symbols and outputs the result to radio transmitting section 215. Here, control information is time-multiplexed on a per frame basis.

Radio transmitting section 215 carries out transmission processing such as D/A conversion, amplification and up-conversion of the control information and the data symbol and transmits the result to radio communication apparatus 100 shown in FIG. 1 from antenna 201.

Next, bit conversion will be described in detail.

As for the data symbol subject to bit conversion, that is, the data symbol used for channel estimation in radio communication apparatus 200, bit conversion section 102 of radio communication apparatus 100 converts at least one of a plurality of bits forming the data symbol, to "1" or "0," as described below.

Bit Conversion Example 1

Figure 3:
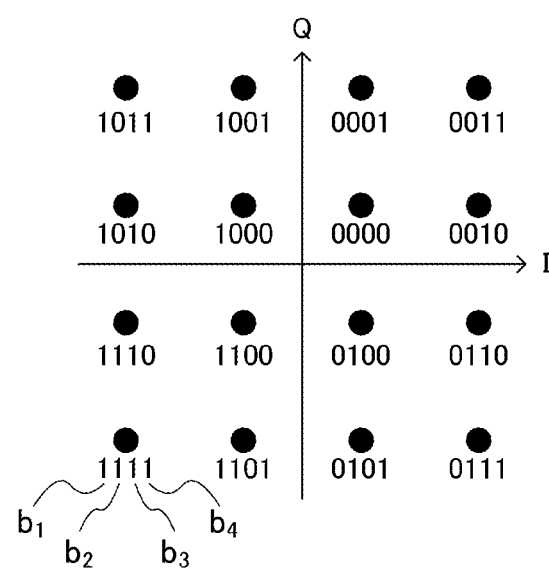
FIG. 3 is a constellation diagram according to Embodiment 1 of the present disclosure (Example 1)

FIG. 3 shows a constellation diagram for the modulation scheme of 16QAM. In this constellation diagram, signal points are arranged such that each symbol formed with bits $b_1$ to $b_4$ differs from adjacent symbols by one bit, to improve bit error rate performances. This signal point constellation is referred to as "Gray coding."

Then, when a data symbol subject to bit conversion is one of signal point constellations shown in FIG. 3, bit conversion section 102 forcibly converts the lower two bits, the lower three bits or all of the four bits of bits $b_1$ to $b_4$ to "1."

Figure 4A:
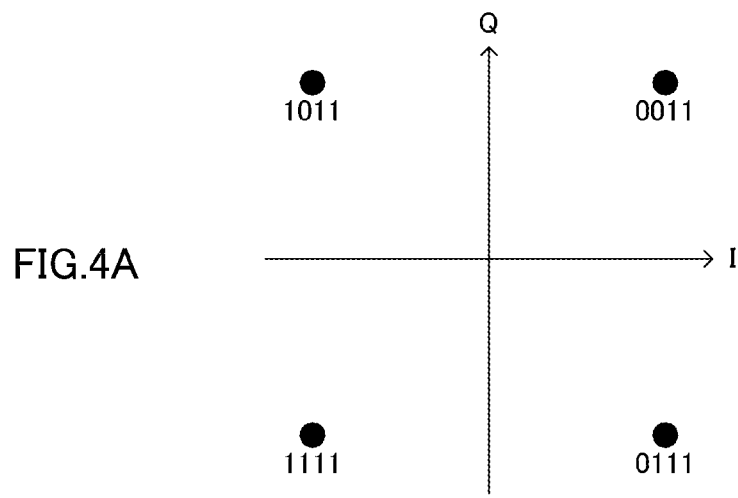
FIG. 4A is an example of bit conversion according to Embodiment 1 of the present disclosure (QPSK)

When the lower two bits are converted to "1," the signal point constellation for the data symbol after bit conversion is one of "0011," "0111," "1111" and "1011," as shown in FIG. 4A. In this case, in radio communication apparatus 200, similar to the constellation diagram for QPSK, tentative decision can be carried out by positive/negative decision alone with respect to the I-axis and the Q-axis.

Figure 4B:
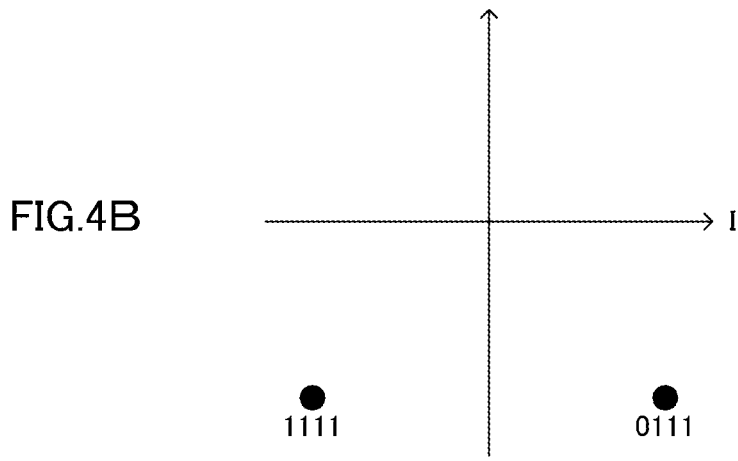
FIG. 4B is an example of bit conversion according to Embodiment 1 of the present disclosure (BPSK)

Further, when the lower three bits are converted to "1," the signal point constellation for a data symbol after bit conversion is one of "0111" or "1111," as shown in FIG. 4B. In this case, in radio communication apparatus 200, similar to the constellation diagram for BPSK, tentative decision can be carried out by positive/negative decision alone with respect to the I-axis.

Figure 4C:
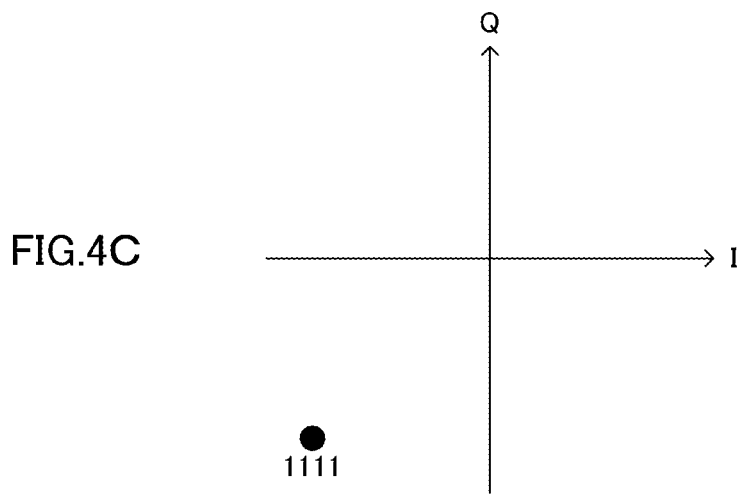
FIG. 4C is an example of bit conversion according to Embodiment 1 of the present disclosure (Pilot)

Furthermore, when all of the four bits are converted to "1," the signal point constellation for the data symbol after bit conversion is "1111" alone as shown in FIG. 4C. In this case, in radio communication apparatus 200, the data symbol can be regarded as the pilot symbol.

The accuracy of tentative decision in radio communication apparatus 200 increases in the order of FIG. 4A (where the lower two bits are converted to "1"), FIG. 4B (where the lower three bits are converted to "1") and FIG. 4C (where all of the four bits are converted to "1"). The number of bits subject to conversion is determined according to control information transmitted from radio communication apparatus 200 as described above.

Figure 5A:
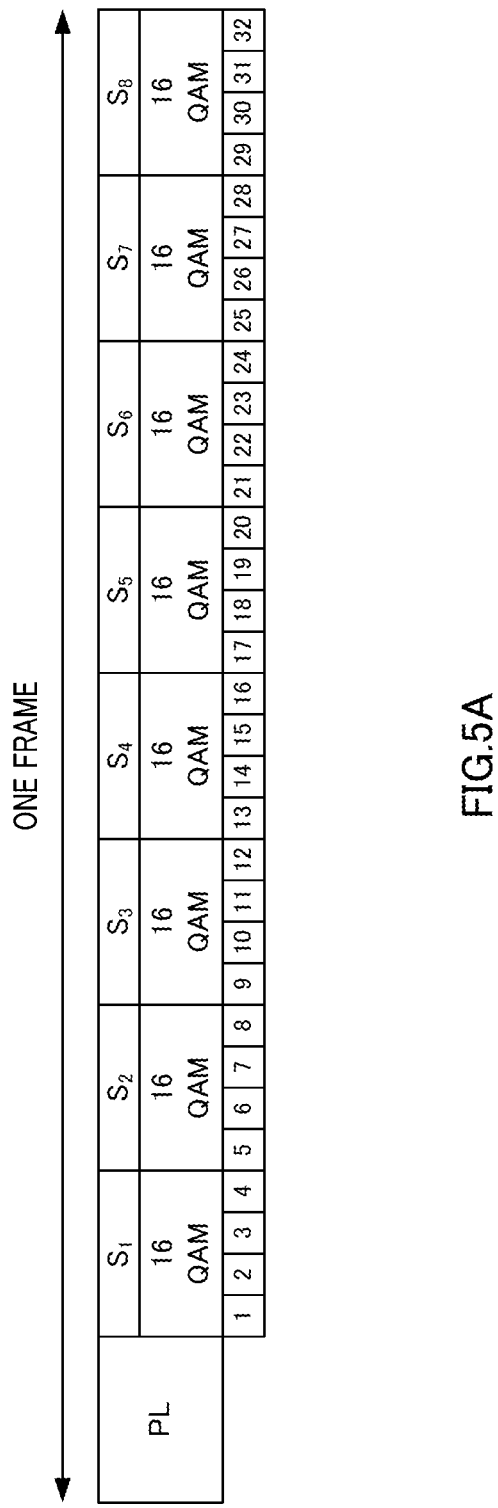
FIG. 5A is an example of a frame configuration according to Embodiment 1 of the present disclosure (before bit conversion)

Further, for example, in the frame configuration shown in FIG. 5A, When the data symbol subject to bit conversion is determined data symbol $S_4$ and the number of bits subject to conversion is determined three, the lower three bits (bits 14 to 16) of bits 13 to 16 forming data symbol $S_4$, are converted to "1." As a result, in addition to channel estimation by means of pilot symbol PL, radio communication apparatus 200 can carry out channel estimation using symbol $S_4$ subjected to tentative decision based on the constellation diagram for BPSK, which is more accurate than the constellation diagram for 16QAM.

Figure 5B:
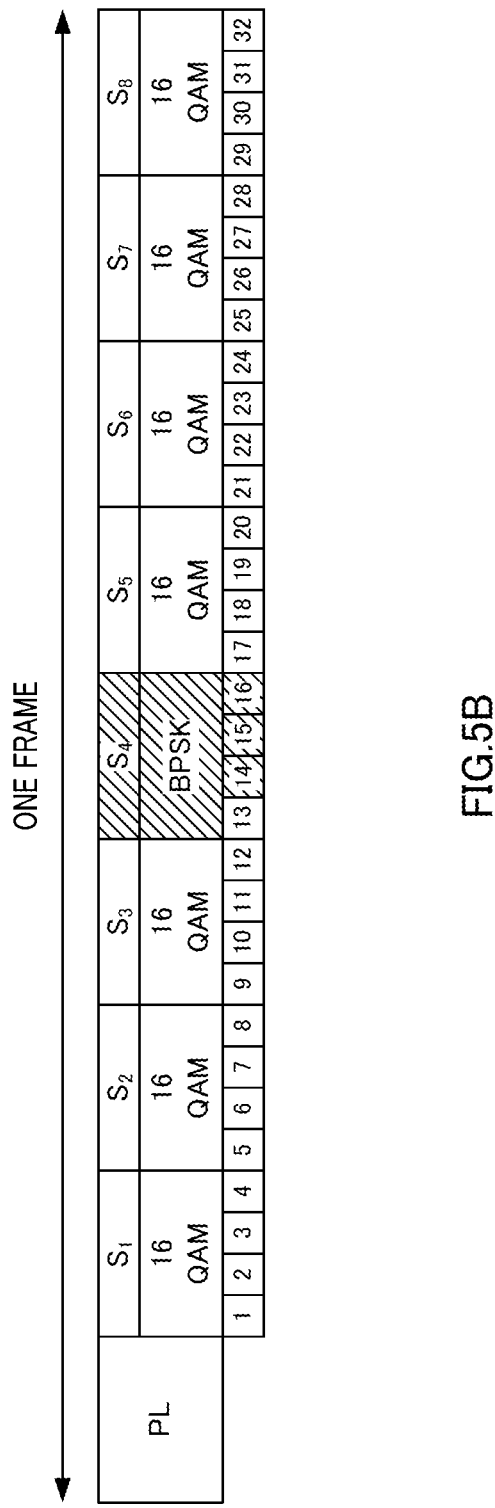
FIG. 5B is an example of a frame configuration according to Embodiment 1 of the present disclosure (after bit conversion)

Furthermore, in any case of FIG. 4A to FIG. 4C, in a data symbol subject to bit conversion, the number of bits before bit conversion and the number of bits after bit conversion are both four and do not change. For example, as shown in FIGS. 5A and 5B, the number of bits of data symbol $S_4$ subject to bit conversion is four even after bit conversion. As a result, modulating section 103 of radio communication apparatus 100 can generate data symbol $S_4$ after bit conversion similar to other data symbols by using 16QAM. That is, modulating section 103 can modulate a bit sequence of bits 1 to 32 using a single modulation mapper for 16QAM even after bit conversion.

Further, the number of bits subject to conversion is determined according to the SINR, so that it is possible to minimize transmission rate decrease.

Bit Conversion Example 2

Figure 6:
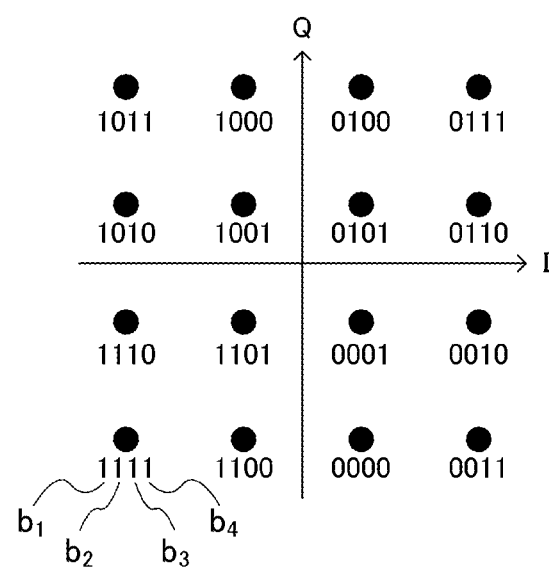
FIG. 6 is a constellation diagram according to Embodiment 1 of the present disclosure (Example 2)

In bit conversion example 2, the constellation diagram shown in FIG. 6 is used as the constellation diagram for 16QAM. This constellation diagram is a special constellation diagram where the signal point constellation for a data symbol after bit conversion is the signal point constellation for 8PSK. That is, in bit conversion example 2, bit conversion section 102 carries out bit conversion in accordance with the special constellation diagram where the signal point constellation for a data symbol after bit conversion is the signal point constellation for 8PSK.

To be more specific, even when the data symbol subject to bit conversion is one of signal point constellations shown in FIG. 6, out of bits $b_1$ to $b_4$, the lowest one bit is forcibly converted to "0," the lower two bits to "1," the lower three bits to "1," or all of the four bits to "1."

Figure 7A:
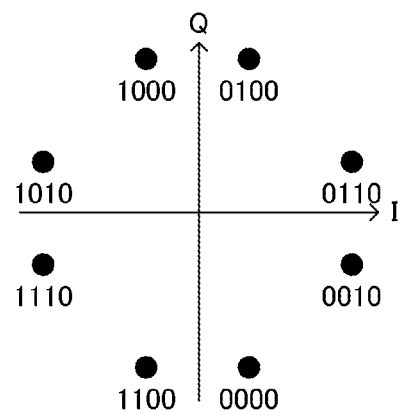
FIG. 7A is an example of bit conversion according to Embodiment 1 of the present disclosure (8PSK)

When the lowest one bit is converted to "0," the signal point constellation for a data symbol after bit conversion is one of "0100," "0110," "0010," "0000," "1100," "1110," "1010," and "1000," as shown in FIG. 7A. In this case, radio transmission apparatus 200 can carry out tentative decision based on angle alone, similar to the constellation diagram for 8PSK.

Figure 7B:
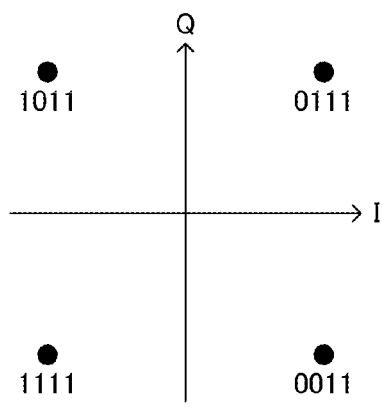
FIG. 7B is an example of bit conversion according to Embodiment 1 of the present disclosure (QPSK)

Further, when the lower two bits are converted to "1," the signal point constellation for a data symbol after bit conversion is one of "0111," "0011," "1111," and "1011," as shown in FIG. 7B. In this case, in radio communication apparatus 200, similar to the constellation diagram for QPSK, tentative decision can be carried out by positive/negative decision alone with respect to the I-axis and the Q-axis.

Figure 7C:
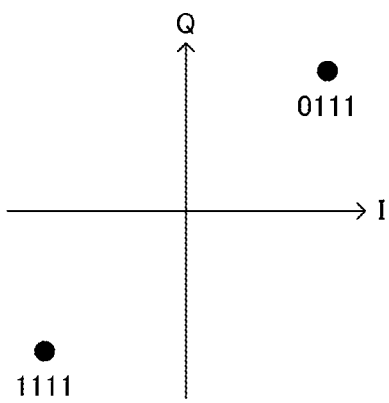
FIG. 7C is an example of bit conversion according to Embodiment 1 of the present disclosure (BPSK)

Further, when the lower three bits are converted to "1," the signal point constellation for a data symbol after bit conversion is one of "0111" and "1111," as shown in FIG. 7C. In this case, in radio communication apparatus 200, similar to the constellation diagram for BPSK, tentative decision can be carried out by positive/negative decision alone with respect to the I-axis alone.

Figure 7D:
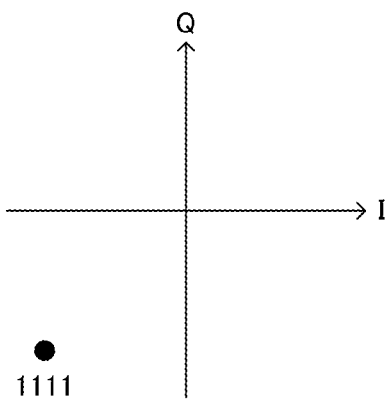
FIG. 7D is an example of bit conversion according to Embodiment 1 of the present disclosure (Pilot)

Further, when all of the four bits are converted to "1," the signal point constellation for a data symbol after bit conversion is "1111" alone, as shown in FIG. 7D. In this case, in radio communication apparatus 200, a data symbol can be regarded as a pilot symbol.

The accuracy of tentative decision in radio communication apparatus 200 increases in the order of FIG. 7A (where the lowest one bit is converted to "0"), FIG. 7B (where the lower two bits are converted to "1"), FIG. 7C (where the lower three bits are converted to "1") and FIG. 7D (where all of the four bits are converted to "1"). Furthermore, the number of bits subject to conversion is determined according to control information transmitted from radio communication apparatus 200 as described above.

In this way, in bit conversion example 2, by using the special constellation diagram shown in FIG. 6, the signal point constellation for a data symbol after bit conversion is the signal point constellation for 8PSK. That is, it is possible to use more signal point constellation patterns than in bit conversion example 1, as signal point constellation patterns of data symbols after bit conversion. In this way, by using bit conversion example 2, it is possible to carry out more detailed control according to the SINR than in bit conversion example 1, and further suppress transmission rate decrease.

Bit conversion examples 1 and 2 have been described.

Moreover, control information generated in control information generating section 211 of radio communication apparatus 200 is shown in FIGS. 8 and 9. FIG. 8 shows that symbols subject to conversion are determined symbols 3, 5 and 7, and the numbers of conversion bits are determined 1, 3 and 2, respectively. Further, as described above, when the numbers of conversion bits are one, three and two, the signal point constellations correspond to 8PSK, BPSK and QPSK, respectively. Therefore, as shown in FIG. 9, the modulation scheme may be included in control information instead of the number of conversion bits of FIG. 8.

In this way, according to this embodiment, when a modulation scheme with a large M-ary modulation number such as 16QAM is used for a data symbol, it is possible to keep the position of each bit in the frame and improve the accuracy of channel estimation.

Embodiment 2

In this embodiment, coding section 101 shown in FIG. 1 carries out error correcting coding of transmission data (i.e., bit sequence) using systematic codes such as Turbo code and LDPC code. Coding section 101 encodes the transmission bit sequence using systematic code and thereby generates the systematic bits, which are transmission bits and are shown with "S," and parity bits, which are redundancy bits and are shown with "P."

In this case, when error correcting coding is carried out using systematic codes, parity bits are less significant than systematic bits. That is, in radio communication apparatus 200, systematic bits are transmission bits and, when systematic bits are lost, error rate performances deteriorate, and, on the other hand, parity bits are redundancy bits, so that, even though some of parity bits are lost, it is possible to keep required error rate performances.

Then, bit conversion section 102 carries out the same bit conversion of parity bits alone as in Embodiment 1.

Figure 10A:
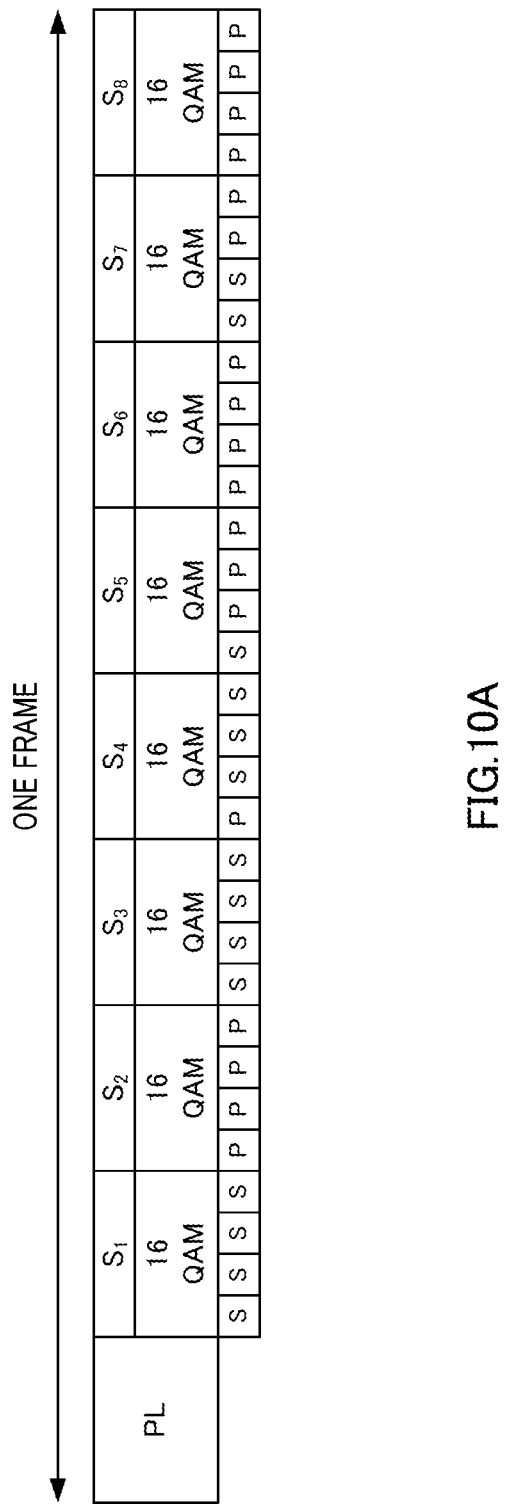
FIG. 10A is an example of a frame configuration according to Embodiment 2 of the present disclosure (before bit conversion)
Figure 10B:
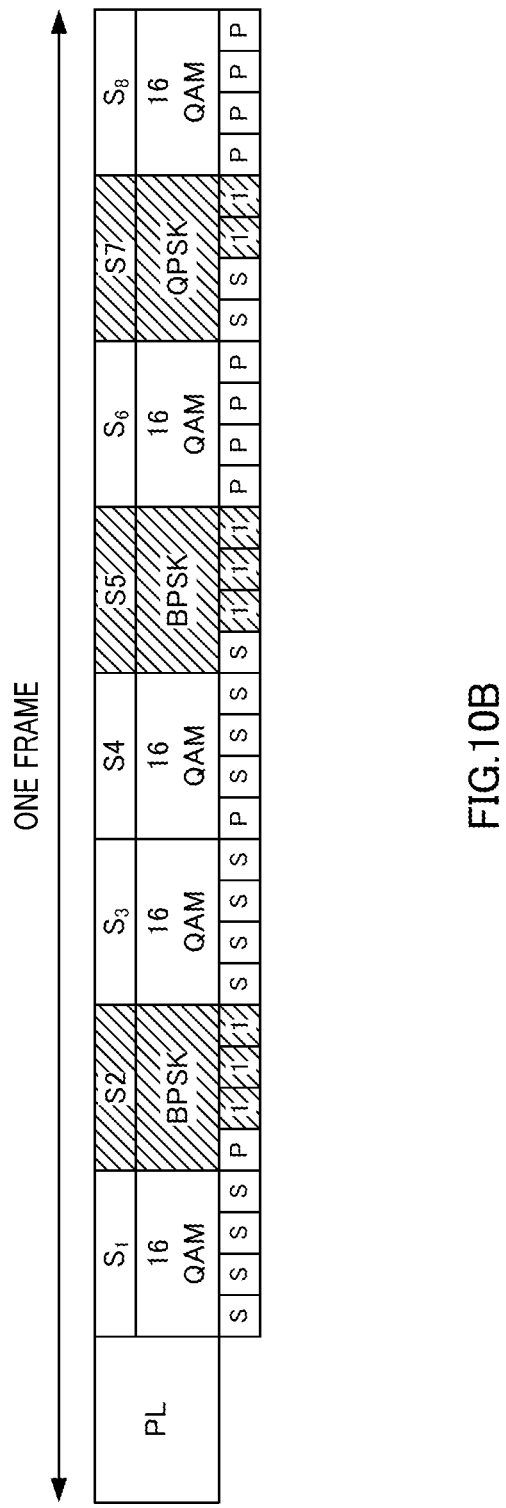
FIG. 10B is an example of a frame configuration according to Embodiment 2 of the present disclosure (after bit conversion)

For example, if in the frame configuration shown in FIG. 10A data symbols subject to bit conversion are determined $S_2$, $S_5$ and $S_7$ and the numbers of bits subject to conversion are three, three and two, respectively, as shown in FIG. 10B, parity bits of the lower three bits of bits forming data symbol $S_2$ are converted to "1," parity bits of the lower three bits of bits forming data symbol $S_5$ are converted to "1" and parity bits of the lower two bits of bits forming data symbol $S_7$ are converted to "1."

In this way, according to this embodiment, by limiting bits subject to bit conversion in bit conversion section 102 to parity bits alone, it is possible to prevent loss of systematic bits due to bit conversion and, consequently, suppress deterioration of error rate performances caused by bit conversion.

Embodiment 3

In this embodiment, even when a data symbol is one of signal point constellation in FIG. 3, two middle bits $b_2$ and $b_3$ of bits $b_1$ to $b_4$ are inverted to be subjected to bit conversion and then subjected to vector synthesis with the data symbol before bit inversion.

Figure 11:
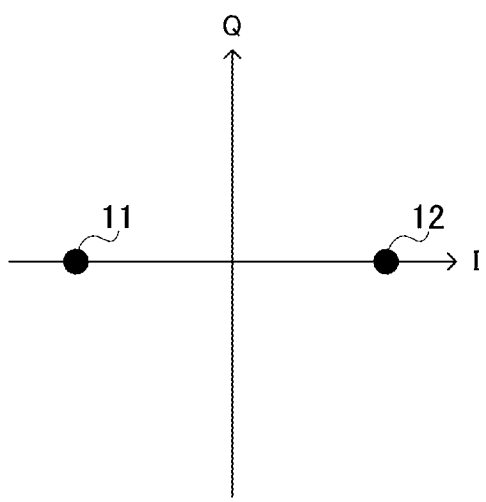
FIG. 11 is an example of bit conversion according to Embodiment 3 of the present disclosure (after synthesis, BPSK)

For example, if data symbol "1011" in FIG. 3 is duplicated and the two middle bits are inverted, the data symbol after bit inversion will be "1101." Then, if these data symbols are subjected to vector synthesis, the signal point constellation is signal point 11 shown in FIG. 11. Similarly, if data symbol "0101" in FIG. 3 is duplicated and the two middle bits are inverted, the data symbol after bit inversion will be "0011." Then, when these data symbols are subjected to vector synthesis, the signal point constellation is signal point 12 of FIG. 11. In this way, as for any data symbol shown in FIG. 3, the two middle bits in a duplicated data symbol are inverted and are vector-synthesized with the data symbol before inversion (the data symbol of the duplication source), the signal point constellation for a synthesized symbol is either one of signal point 11 or 12 alone of FIG. 11.

When the signal point constellation is either one of signal point 11 or 12 shown in FIG. 11, in a radio communication apparatus on the receiving side, similar to the constellation diagram for BPSK, tentative decision can be carried out by positive/negative decision alone with respect to the I-axis.

In this embodiment, radio communication apparatuses adopt the following configuration.

Figure 12:
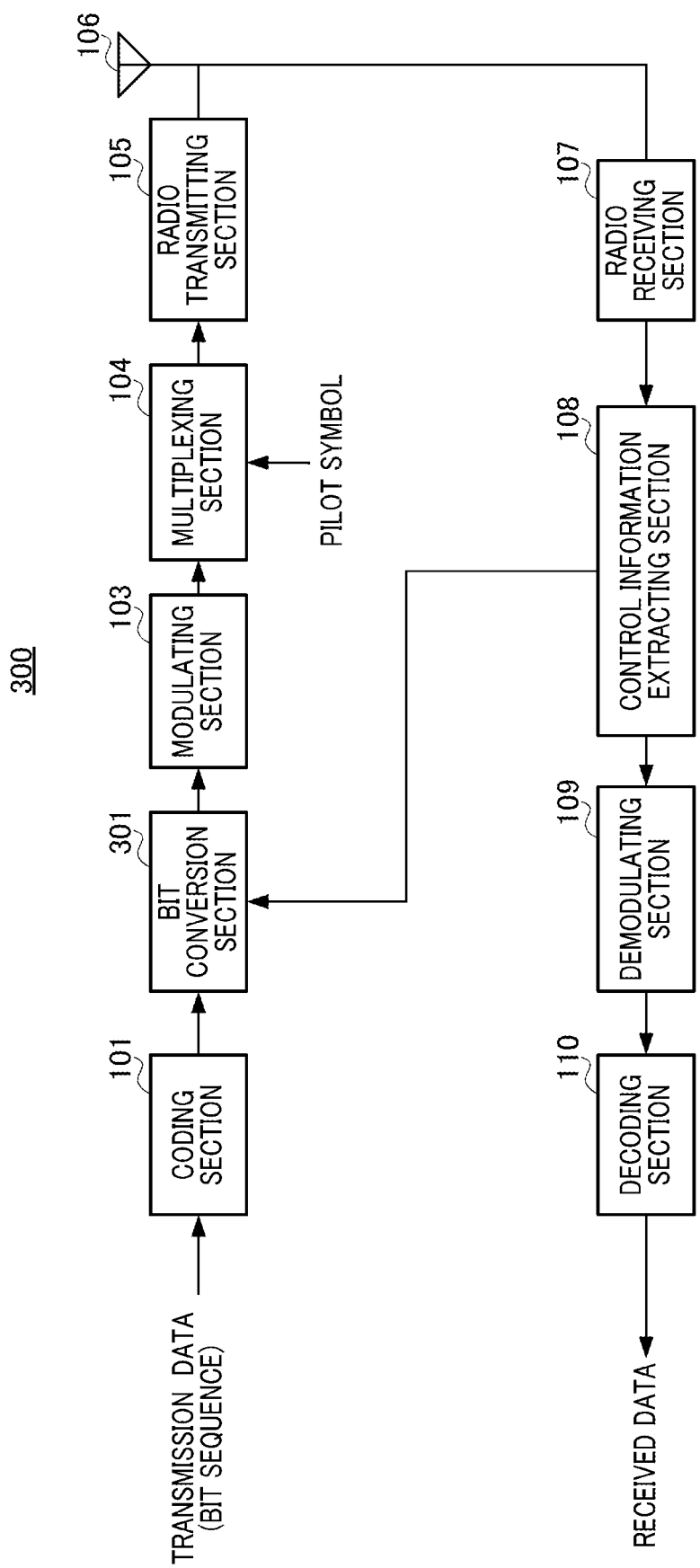
FIG. 12 is a block diagram showing a configuration of the radio communication apparatus on the transmitting side according to Embodiment 3 of the present disclosure.
Figure 13:
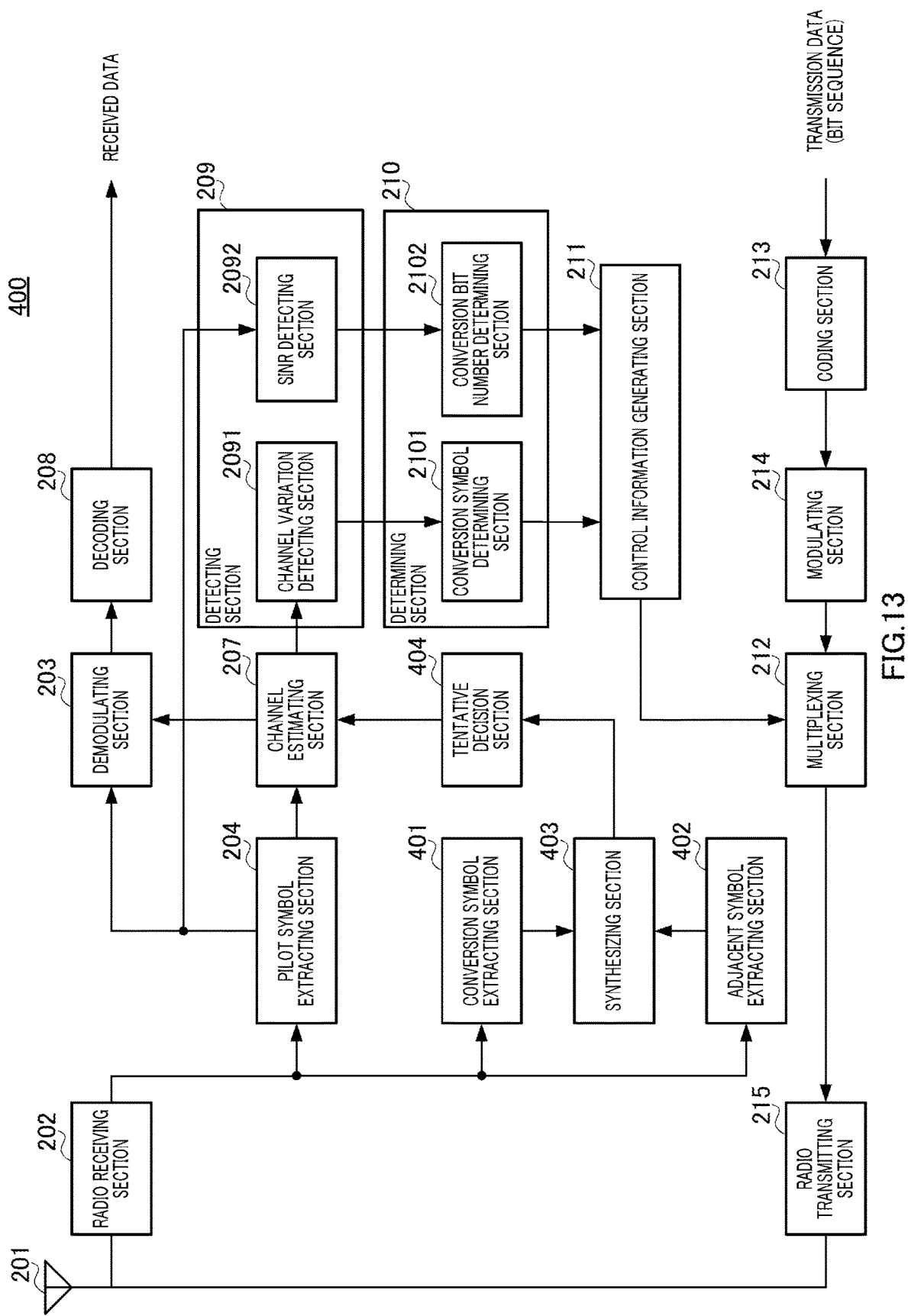
FIG. 13 is a block diagram showing a configuration of the radio communication apparatus on the receiving side according to Embodiment 3 of the present disclosure.

FIG. 12 shows a configuration of radio communication apparatus 300 on the transmitting side according to this embodiment. In FIG. 12, the same configurations as in FIG. 1 (Embodiment 1) will be assigned the same reference numerals and overlapping description will be omitted. Further, FIG. 13 shows a configuration of radio communication apparatus 400 on the receiving side according to this embodiment. In FIG. 13, the same configurations as in FIG. 2 (Embodiment 1) are assigned the same reference numerals and overlapping description will be omitted.

Figure 14:
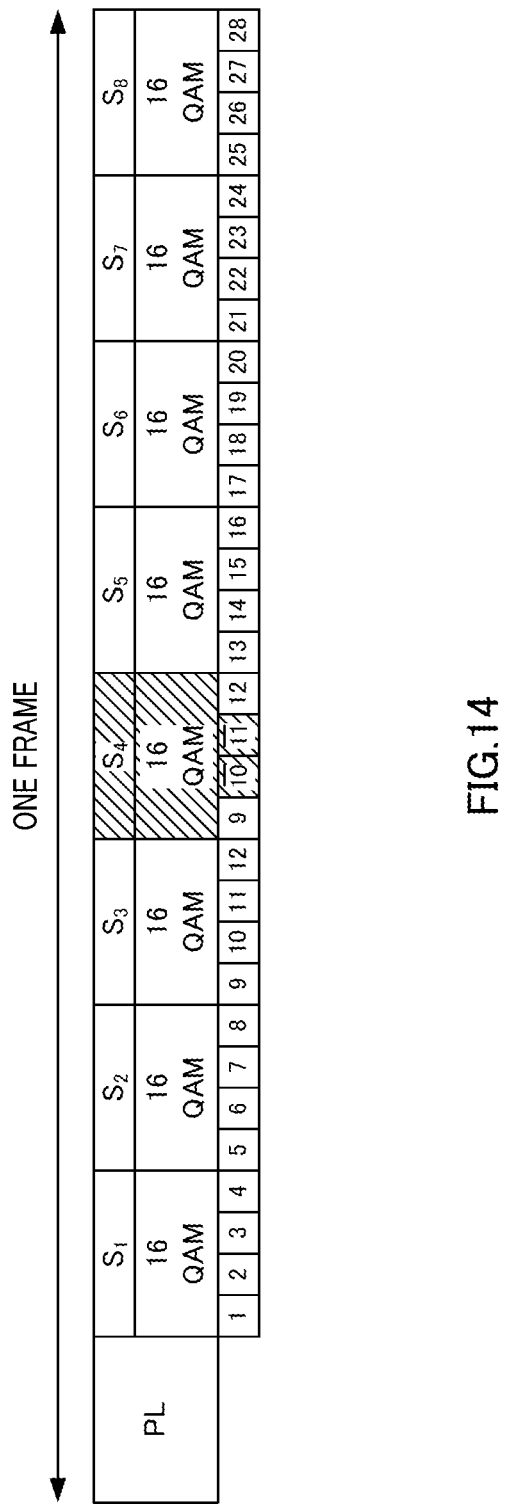
FIG. 14 is an example of a frame configuration according to Embodiment 3 of the present disclosure (after bit conversion)

In radio communication apparatus 300 shown in FIG. 12, bit conversion section 301 duplicates bits 9 to 12 forming data symbol $S_3$ in an encoded bit sequence as shown in, for example, FIG. 14, and acquires data symbol $S_4$. Then, bit conversion section 301 carries out bit conversion by inverting the two middle bits (bits 10 and 11) of bits 9 to 12 forming data symbol $S_4$ and outputs the result to modulating section 103.

On the other hand, in radio communication apparatus 400 shown in FIG. 13, conversion symbol extracting section 401 extracts data symbol $S_4$ subjected to bit conversion in radio communication apparatus 300, from the received signal and outputs the result to synthesizing section 403. Further, adjacent symbol extracting section 402 extracts previous, adjacent data symbol (that is, data symbols of the duplication source) $S_3$ to data symbol $S_4$ subject to bit conversion in radio communication apparatus 300 and outputs the result to synthesizing section 403.

Synthesizing section 403 carries out vector synthesis of data symbol $S_3$ and data symbol $S_4$ and outputs the synthesized symbol generated by the vector synthesis, to tentative decision section 404.

Tentative decision section 404 carries out tentative decision of the synthesized symbol and outputs the synthesized symbol after tentative decision to channel estimating section 207.

Further, even when a data symbol is any one of signal point constellation shown in FIG. 3, all of bits $b_1$ to $b_4$ are inverted to be subjected to bit conversion and are vector-synthesized with the data symbol before bit inversion, the signal point constellation for the synthesized symbol becomes one of four signal points for QPSK. When the signal point constellation is one of four signal points for QPSK, in radio communication apparatus 400, similar to the constellation diagram for QPSK, tentative decision can be carried out by positive/negative decision alone with respect to the I-axis and Q-axis.

Figure 15:
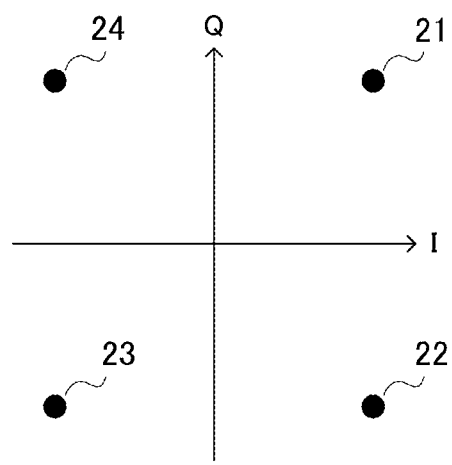
FIG. 15 is an example of bit conversion according to Embodiment 3 of the present disclosure (after synthesis, QPSK)

For example, when data symbol "1011" in FIG. 3 is duplicated and all of the four bits are inverted, the data symbol after bit inversion is "0100." Then, when these data symbols are vector-synthesized, the signal point constellation is signal point 24 of FIG. 15. Similarly, when data symbol "0101" in FIG. 3 is duplicated and all of the four bits are inverted, the data symbol after bit conversion is "1010." Then, when these data symbols are vector-synthesized, the signal point constellation is signal point 23 of FIG. 15. In this way, as for any data symbol shown in FIG. 3, by inverting all of the four bits of duplicated data symbols and vector-synthesizing the data symbols with the data symbol (the data symbol of the duplication source) before inversion, the signal point constellation for the synthesized symbol is one of signal points 21 to 24 alone in FIG. 15.

Figure 16:
FIG. 16 is an example of a frame configuration according to Embodiment 3 of the present disclosure (after bit conversion).

When all of the four bits are inverted, bit conversion section 301 duplicates bits 9 to 12 forming data symbol $S_3$ in the encoded bit sequence shown in, for example, FIG. 16, and acquires data symbol $S_4$. Then, bit conversion section 301 carries out bit conversion of all of the four bits 9 to 12 forming data symbol $S_4$ by inverting the bits and outputs the result to modulating section 103.

In this way, in this embodiment, similar to Embodiment 1, the accuracy of tentative decision in radio communication apparatus 400 increases in the order of inversion of all of bits $b_1$ to $b_4$ and inversion of the two middle bits of bits $b_1$ to $b_4$. Then, in this embodiment, the number of bits subject to conversion is determined according to control information transmitted from radio communication apparatus 400, similar to Embodiment 1.

In this way, according to this embodiment, similar to Embodiment 1, even when a modulation scheme with a large M-ary modulation number such as 16QAM is used for data symbols, it is possible to keep the position of each bit in the frame and improve the accuracy of channel estimation.

Further, by using the previous, adjacent data symbol to the data symbol subjected to bit conversion, as a data symbol of the duplication source, it is possible to minimize channel variations between both data symbols and, consequently, minimize decision errors with the synthesized symbol.

The embodiments of the present disclosure have been described.

Although, in FIG. 5A, FIG. 5B, FIG. 10A, FIG. 10B and FIG. 14, one frame is formed with one pilot symbol (i.e., PL) and eight data symbols ($S_1$ to $S_8$) for ease of explanation, the frame configuration which enables the present disclosure is not limited to this configuration.

Further, radio communication apparatus 100 or 300 is provided in a radio communication base station apparatus (hereinafter simply "base station") in a mobile communication system and radio communication apparatus 200 or 400 is provided in a radio communication mobile station apparatus (hereinafter simply "mobile station") in a mobile communication system, so that, even when a modulation scheme with a large M-ary modulation number such as 16QAM is used with respect to a data symbol transmitted in downlink, it is possible to keep the position of each bit in the frame and improve the accuracy of channel estimation in the mobile station. Further, by providing radio communication apparatus 100 or 300 in a mobile station and radio communication apparatus 200 or 400 in a base station, even when a modulation scheme with a large M-ary modulation number such as 16QAM is used with respect to a data symbol transmitted in uplink, it is possible to keep the position of each bit in the frame and improve the accuracy of channel estimation in the base station.

Furthermore, in the above embodiments, the base station and mobile station may be referred to as Node B and UE, respectively.

Furthermore, although cases have been described with the above embodiments where the number of conversion bits are determined based on the SINR, the number of conversion bits may be determined based on the SNR, SIR, CINR, received power, interference power, bit error rate, throughput or the MCS (i.e., Modulation and coding Scheme) which achieves predetermined error rate, instead of the SINR. That is, in the present disclosure, the number of conversion bits is determined based on one of the above parameters showing received quality.

Also, although cases have been described with the above embodiment as examples where the present disclosure is configured by hardware. However, the present disclosure can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-228687, filed on Aug. 5, 2005, the entire content of which is expressly incorporated by reference herein.

INDUSTRIAL APPLICABILITY

The present disclosure can be applied to a mobile communication system and the like.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus comprising:
a transmitter that transmits control information; and
a receiver that receives a plurality of bits that are mapped on one of modulation symbols in a modulation mapper, each place of a number of bits out of the plurality of bits being forcibly set to a 1, and the number of bits being determined from the control information,
wherein a number of the modulation symbols is less than an M-ary number of the modulation mapper.

2. The communication apparatus according to claim 1, wherein the modulation symbols are part of the M-ary number of modulation symbols.

3. The communication apparatus according to claim 1, wherein a distance between the modulation symbols is equivalent to a largest of distance existing among the M-ary number of modulation symbols in the modulation mapper.

4. The communication apparatus according to claim 1, wherein the modulation symbols are detected by positive or negative decision only with respect to at least one of an I-axis and a Q-axis in the modulation mapper.

5. The communication apparatus according to claim 1, wherein the number of the modulation symbols is 4, and the M-ary number is 16.

6. The communication apparatus according to claim 1, wherein the number of the modulation symbols is 4 out of 16 modulation symbols in the modulation mapper for 16 QAM.

7. The communication apparatus according to claim 1, wherein the modulation symbols form a constellation of BPSK, QPSK or 8-PSK in the modulation mapper for 16QAM.

8. The communication apparatus according to claim 1, wherein each place of the lower two bits of the plurality of bits to is forcibly set to the 1.

9. The communication apparatus according to claim 1, wherein each place of the lower two bits of the plurality of bits to is forcibly set to the 1, and the number of the modulation symbols is 4, and the M-ary number is 16.

10. The communication apparatus according to claim 1, wherein each place of the lower four bits of the plurality of bits to is forcibly set to the 1.

11. A communication method comprising:
transmitting control information; and
receiving a plurality of bits that are mapped on one of modulation symbols in a modulation mapper, each place of a number of bits out of the plurality of bits being forcibly set to a 1, and the number of bits being determined from the control information,
wherein a number of the modulation symbols is less than an M-ary number of the modulation mapper.

12. The communication method according to claim 11, wherein the modulation symbols are part of the M-ary number of modulation symbols.

13. The communication method according to claim 11, wherein a distance between the modulation symbols is equivalent to a largest of distance existing among the M-ary number of modulation symbols in the modulation mapper.

14. The communication method according to claim 11, wherein the modulation symbols are detected by positive or negative decision only with respect to at least one of an I-axis and a Q-axis in the modulation mapper.

15. The communication method according to claim 11, wherein the number of the modulation symbols is 4, and the M-ary number is 16.

16. The communication method according to claim 11, wherein the number of the modulation symbols is 4 out of 16 modulation symbols in the modulation mapper for 16 QAM.

17. The communication method according to claim 11, wherein the modulation symbols form a constellation of BPSK, QPSK or 8-PSK in the modulation mapper for 16QAM.

18. The communication method according to claim 11, wherein setting each place of the lower two bits of the plurality of bits is forcibly set to the 1.

19. The communication method according to claim 11, wherein each place of the lower two bits of the plurality of bits to is forcibly set the 1, and the number of the modulation symbols is 4, and the M-ary number is 16.

20. The communication method according to claim 11, wherein each place of the lower four bits of the plurality of bits to is forcibly set the 1.

\* \* \* \* \*